United States Patent Office

3,017,720
Patented Jan. 23, 1962

3,017,720
SOIL STABILIZATION AND SEEDING
Thomas N. Busch, Daphne, Ala., assignor to International Paper Company, New York, N.Y., a corporation of New York
No Drawing. Filed Dec. 23, 1958, Ser. No. 782,356
4 Claims. (Cl. 47—58)

This invention relates to a method of stabilizing the ground soil surface by application of a fibrous mat-forming and vegetation promoting substance in slurry form.

One of the problems in maintaining the surface and grade of newly graded embankments and other surfaces of the ground in connection with ground surface and sub-surface construction and maintenance is in holding the surface of the raw earth against erosion until a surface retaining vegetation such as grass, ground ivy, plants, bushes or trees can be established.

In dry parts of the county the surface is subject to wind erosion and in wet areas to rainfall erosion. Embankments adjacent rivers, lakes and seas are subject to erosion by wave and current action. Efforts to plant grass and other seeds and to establish vegetation growth are frustrated by blowing and washing away of the surface soil and of the seeds during the periods of time before general growth is established over a substantial portion of the surface. Ordinary seed planting and plant growing methods are, therefore, expensive and unduly time consuming.

It is the general object of the present invention to provide a method which can be practiced at a great saving of expense and time for holding the soil surface against erosion and at the same time for planting the seeds and other components required for starting sod vegetation and promoting a more rapid growth of the vegetation while retaining the soil surface in place on and around the seeds and other components until such growth is established.

The carrying out of the above described and other objects wil become apparent from the further description of the method of the invention.

In applying the method to practical use a mixture of cellulosic fibers, preferably wood pulp fibers in disintegrated form is prepared, preferably by any of the well known pulp wood digestion or cooking processes such as the kraft or sulphate process, the soda process, the sulphite process or the ground wood process. By any of these processes the cellulosic fibers of logs or bolts of wood are separated from each other by chemical or mechanical dissolution and removal of the lignin material which binds the fibers together. By such means a mass of disintegrated, discrete or separate fibers is produced as pulp. In other words, paper mill pulp may be used.

The cellulosic pulp is washed to remove process chemicals such as caustic soda and the like and other impurities which would be injurious to plant growth. Then the pulp is mixed and diluted with water to form an aqueous slurry of suitable consistency, i.e. proportion of insoluble solids content to water, and which consists essentially of the discrete cellulose pulp fibers in preponderance as a mat forming ingredient and to this slurry may be added grass or other plant seeds, fertilizer, and other ground preserving and vegetation promoting chemicals, binders and the like desirable for retaining the loose particles of the soil surface and for promoting vegetation.

The components in the slurry are well mixed and the mixture is then applied to the soil surface, preferably by force spraying through a spray nozzle. It may also be poured through a gravity type sprinkler or distributed by centrifugal force as through a rotating sprinkler nozzle or directly poured on the ground. The means for application may be chosen as circumstances and conditions of application warrant and with particular attention to the desirability of even distribution over the area of application.

When applied consistently and continuously over the ground surface area the pulp slurry forms a mat of interwoven cellulosic fibers providing an unbroken blanket over the surface of the treated soil area. The liquefied fibrous material when applied as a mat conforms to the soil particles, crevices, ridges, rocks and other surface material and conformations, thoroughly enmeshing and locking the surface particles so that they remain in repose.

The application of the fibrous blanket in slurry form readily lends itself to the use of hydraulic equipment such as mobile tanks, pumps and nozzles by the use of which large surface areas may be covered quickly at low cost. Because of the large areas which may be readily and quickly covered by the method of our invention, the application of the fibrous mat may keep pace with construction of cuts, hills, slopes, embankments and other new surfaces on highways, levees, dams, terraces, yards, housing projects, airports and the like so that the soil particles are immediately anchored in place, preserving the surface and minimizing the need to rework such surfaces such as otherwise occurs when soil stabilization activity lags behind construction activity.

By incorporating grass or other plant seed in the mixture, the application of the slurry plants the seed simultaneously with the application of the fiber blanket. The seeds are thereby prevented from blowing away or becoming washed away because the seed is also enmeshed and locked in place by the blanket on the soil surface particles.

By application of seeds in this manner, the seeds germinate more rapidly due to improved moisture conditions. The fibrous mat acts as a mulch and as a piece of blotting paper inducing capillary action and the seeds are hidden in the mat, safe from depredations of birds and rodents.

Fertilizers may also be applied in solution simultaneously with the application of the fibrous mat containing the seeds, thus further saving labor. The fibrous mat retards leaching of the fertilizer and holds the fertilizer so that it gradually becomes effective by soaking into the ground as needed.

As additional components, substantial high wet strength agents may be included in the slurry as necessary or desirable, such as urea resins, melamine and the like to extend the useful life of the fibrous mat until plant growth is established.

Lignin may be added or left in the pulp as useful under certain conditions because it acts as a binder for the fibers after the formation of the mat adding to its life and thus also provides a by-product outlet for the lignin produced in the paper mill in the digestion process.

Formaldehyde may also be added to the slurry to extend the useful life of the mat.

Calcium chlorides may be added to the slurry to keep the mat in a damp condition by reason of their hygroscopic properties. Other forms of calcium may be added to harden the surface of the mat thereby to minimize mechanical deterioration due to erosive forces of wind, rain and water.

The method involves a reduction of fire hazard when compared to the application of the usual soil retaining materials such as hay, straw and other bulk materials generally used in soil stabilization. Being less bulky the fibrous blanket does not harbor rodents.

The method of the invention thus has many advantages in the stabilization of soil surfaces. It is easily and cheaply handled and applied and it combines simultaneous application of all of the components necessary not only to maintain the surface prior to the establishment of vegetation but also to establish the vegetation rapidly and efficiently.

For the purposes of definition, the term "plant seeds" is used hereinafter to include seeds of grass, vines, flowers, grain, plants, bushes, trees and any other growing vegetation useful in planting or re-planting the soil surface.

The term "plant growth promoting components" is used to include fertilizers, hygroscopic salts and any other materials useful in preserving and promoting plant growth.

The term "binder" is used to include any materials useful in binding together either the fibers of the mat or blanket or of the ground surface particles to prolong the life of the blanket or of the ground surface.

I claim:

1. A method of soil stabilization which comprises the steps of forming an aqueous slurry consisting essentially of discrete cellulose pulp fibers in preponderance as a mat forming ingredient and including plant seeds and applying the slurry on the soil surface, thereby forming a continuous mat of interwoven said fibers containing and covering said seed.

2. A method of soil stabilization which comprises the steps of forming an aqueous slurry consisting essentially of discrete cellulose pulp fibers in preponderance as a mat forming ingredient and including plant seeds and plant growth promoting components and applying the slurry on the soil surface thereby forming a continuous mat of interwoven said fibers containing said seed and plant growth promoting components.

3. A method of soil stabilization which comprises the steps of forming an aqueous slurry consisting essentially of wood pulp fibers in preponderance as a mat forming ingredient and including plant seeds, plant growth promoting components and a binder for the fibers and applying the slurry on the soil surface thereby forming a continuous water insoluble mat of interwoven said fibers with the plant seeds and other ingredients distributed and retained in the mat.

4. A method of soil stabilization which comprises the steps of forming an aqueous slurry consisting essentially of discrete cellulose pulp fibers in preponderance as a mat forming ingredient and applying the slurry on the soil surface in combination with plant seeds thereby forming a continuous mat of interwoven said fibers containing and covering said seed.

References Cited in the file of this patent

UNITED STATES PATENTS

| | | |
|---|---|---|
| 1,962,806 | Clapp | June 12, 1934 |
| 1,978,102 | Clapp | Oct. 23, 1934 |
| 2,802,303 | Weeks | Aug. 13, 1957 |
| 2,878,617 | Finn | May 24, 1959 |
| 2,935,853 | Weeks | May 10, 1960 |

FOREIGN PATENTS

| | | |
|---|---|---|
| 166,194 | Australia | Dec. 2, 1955 |

OTHER REFERENCES

"Condensed Chemical Dictionary," Fifth Edition, published by Reinhold (N.Y.), 1956. Pages 36 and 37 relied on.